United States Patent [19]
Wendt

[11] Patent Number: 4,695,919
[45] Date of Patent: Sep. 22, 1987

[54] CIRCUIT ARRANGEMENT FOR PROTECTION AGAINST SURGE VOLTAGES FOR A REPEATER

[75] Inventor: Peter Wendt, Augsburg, Fed. Rep. of Germany

[73] Assignee: Siemens Aktiengesellschaft, Berlin and Munich, Fed. Rep. of Germany

[21] Appl. No.: 716,091

[22] Filed: Mar. 26, 1985

[30] Foreign Application Priority Data

Mar. 30, 1984 [DE] Fed. Rep. of Germany ....... 3411942

[51] Int. Cl.[4] .............................................. H02H 1/04
[52] U.S. Cl. .................................... 361/110; 361/119; 340/425
[58] Field of Search ............... 361/110, 111, 113, 119; 179/170 R, 170 J

[56] References Cited

U.S. PATENT DOCUMENTS

| | | | |
|---|---|---|---|
| 3,089,004 | 5/1963 | Oswald | 179/170 J |
| 3,254,303 | 5/1966 | Brewer et al. | 179/170 J |
| 3,441,869 | 4/1969 | Thompson | 361/110 X |
| 3,530,393 | 9/1970 | Thatch et al. | 330/56 |
| 4,099,217 | 7/1978 | Fitchew | 361/119 X |
| 4,110,570 | 8/1978 | Foster | 361/119 X |
| 4,202,024 | 5/1980 | Simokat | 361/111 X |
| 4,463,406 | 7/1984 | Sirel | 361/110 X |

FOREIGN PATENT DOCUMENTS

| | | |
|---|---|---|
| 0042014 | 12/1981 | European Pat. Off. . |
| 1139826 | 11/1962 | Fed. Rep. of Germany ... 179/170 J |
| 1462247 | 11/1968 | Fed. Rep. of Germany . |
| 2843919 | 4/1980 | Fed. Rep. of Germany . |
| 3122084 | 1/1983 | Fed. Rep. of Germany . |

OTHER PUBLICATIONS

Foster et al, "NG-1 Submerged Repeater", Electrical Communication, vol. 53, No. 2, 1978, pp. 108–111.
Peters, "Stromversorgungsweichen Für Ferngespeiste Trägerfrenquenzzwischenverstärker, Frequenz, vol. 28, No. 12, 1974, pp. 326–333.

Primary Examiner—A. D. Pellinen
Assistant Examiner—A. Jonathan Wysocki
Attorney, Agent, or Firm—Hill, Van Santen, Steadman & Simpson

[57] ABSTRACT

An intermediate repeater or a regenerative repeater has a circuit arrangement for the coarse protection against surge voltages, the arrangement comprising current supply separating filters for the remote feeding via a remote feed current path, fed via the inner conductor of a coaxial cable, which contain a low-pass filter, respectively. In the case of a circuit arrangement of this type, noise pulses, which a surge voltage arrester causes, are to be greatly reduced with respect to edge steepness. To this end, a series connection is provided containing the surge voltage arrester and an inductance, which series circuit, via a low-pass filter disposed outside of the remote feed current path, is connected between the low-pass filters of the current supply separating filters to the remote feed current path and to a connection of the outer conductors of the cables.

9 Claims, 3 Drawing Figures

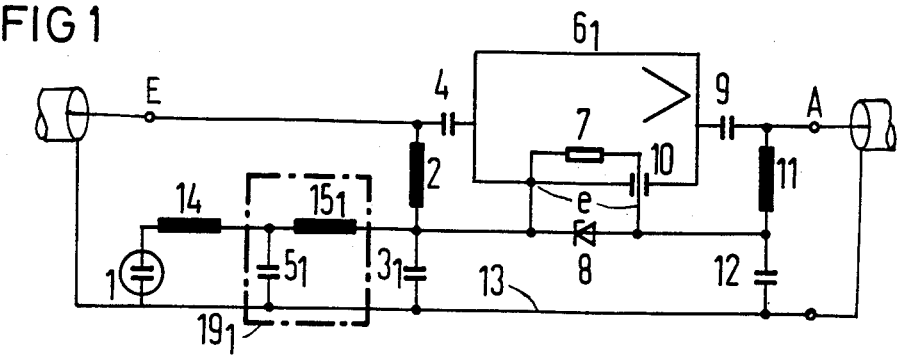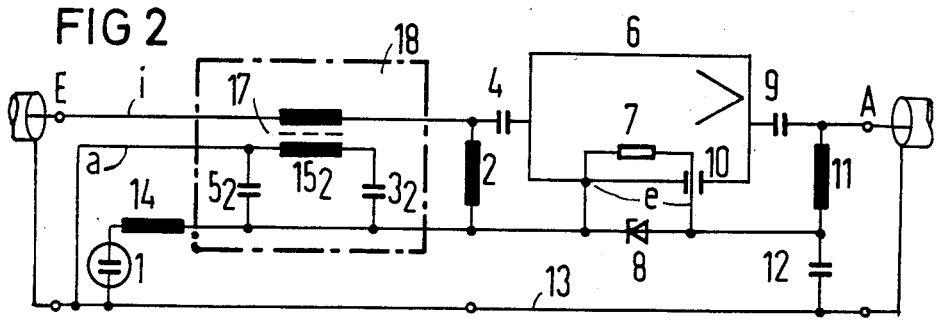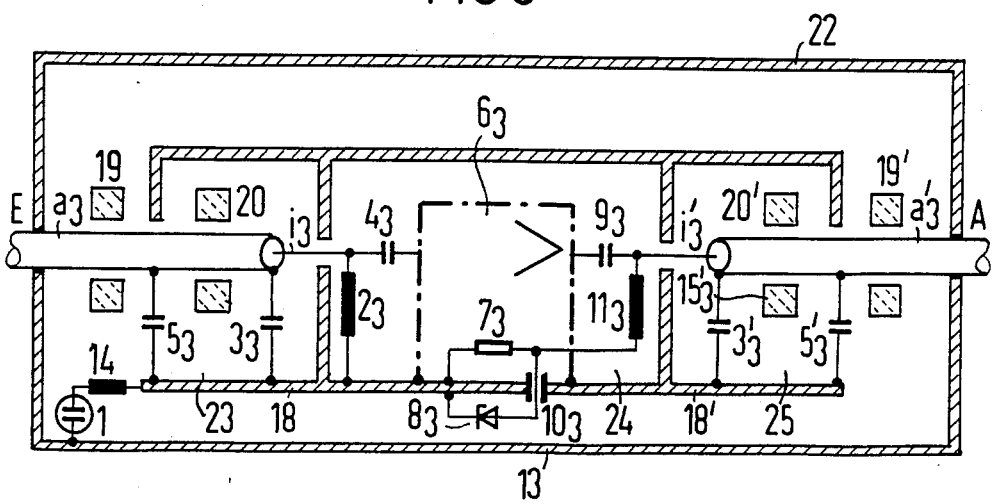

CIRCUIT ARRANGEMENT FOR PROTECTION AGAINST SURGE VOLTAGES FOR A REPEATER

BACKGROUND OF THE INVENTION

1. Field of the Invention

The present invention relates to a circuit arrangement for the coarse protection against surge voltages for an intermediate repeater or regenerative repeater of a communications installation, comprising a coaxial length of cable which is provided at the input and at the output with a current supply separating filter, respectively, and, at the input and/or at the output is provided with a device containing a surge voltage arrester for the purpose of coarse protection against surge voltages in the case of surge voltage influencing on the length of cable, whereby the current supply separating filters, which are provided for the purpose of remote feeding via a remote feed current path including the inner conductor of the coaxial cable, respectively contain an inductor arrangement, and whereby the remote feed current path extends via the inductor arrangements of the current supply separating filters and the feed input therebetween of the intermediate repeater or regenerative repeater, and whereby the outer conductor of the incoming cable and the outer conductor of the outgoing cable are interconnected by way of a cable outer conductor connection of the coaxial length of cable.

2. Description of the Prior Art

A circuit arrangement of the type generally set forth above is already known from the Austrian Letters Patent No. 5 20 220.

In the case of the known circuit arrangement, the inner conductor and the outer conductor of the incoming coaxial cable are directly connected to the input of the intermediate repeater via a surge voltage arrester in order to protect the intermediate repeater against arcings. In the case of response of the surge voltage arrester, a steep voltage jump occurs, which attenuated by the pre-equalizer but, acts on the input of the repeater. In the case of regenerators which transmit very broadband signals, however, such an attenuation is not available. In this case, a corresponding design of the fine protection against surge voltages and of the active regenerator portion is then necessary.

In the case of the known circuit arrangement, a capacitor connects the one connection of a feed input with the outer cable conductor connection. The capacitor must have a low impedance for high frequencies in order to avoid a high-frequency feedback from the output of the repeater to the input. Therefore, the surge voltage arrester, in terms of high frequency, i.e. for the frequencies contained in the steep switching edge of the surge voltage arrester, is connected in parallel with the inductor located in the remote feed current path, so that a high-frequency noise pulse generated by the surge voltage arrester is input-coupled via the high-pass filter located at the repeater input into the equalizer provided at the input.

From W. Peters: "Current Supply Separating Filters for Remotely Fed Carrier Frequency Intermediate Repeaters", Frequency 28 (1974), pp. 326–333, particularly Page 327, illustration 2C1, current supply separating filters are already known which contain a low pass filter in order to increase the circulatory attenuation. In this connection, the term circulatory attenuation is intended to denote the attenuation between the output pair of terminals and the input pair of terminals of the repeater. From Page 328, illustration 4, a so-called potential separating filter having line inductors is apparent. In the case of line inductors the two windings are a very low resistance to the oppositely-flowing signal current. A very high resistance is offered the current flowing only through one winding, respectively. The illustrations 15E and 15F on Page 332 show coaxially-constructed potential separating filters.

From U.S. Pat. No. 4,467,472, fully incorporated herein by this reference, a frequency separating filter is already known in which the outer conductor of a homogeneous line is connected with the inner conductor of a heterogenous line. The connection, adjacent a connection cable, of the outer conductor of the hetergenous line is connected to the shield, the other connection is connected with the reference potential of the active regenerator portion.

The surge voltages which occur in the case of surge voltage influence on lengths of coaxial cable, generally have comparatively great rise times in the microsecond range and pulse durations on the order of magnitude of one more second. The rise time and the pulse duration of digital signals of a high-bit rate lies in the nanosecond range. It follows therefrom that the current supply separating filters of the regenerative repeaters, which are designed for the transmission of the high-frequency useful pulses, exhibit a great attenuation of low-frequency noise pulses from the cable. Surge voltage pulses having flat edges in the microsecond range are virtually completely deflected at the current supply separating filters. Examinations within the scope of the present invention have shown that the fine protection against surge voltages in these instances need not take up any energy as long as the amplitude of the surge voltage pulses lies below their minimum operating voltage of the arresters.

However, the surge voltage arrester can, upon responding, generate voltage jumps having very steep edges. In order that the noise pulses therefore coupled in can be taken up by the fine protection circuits against surge voltages, e.g. current limiting resistances with relatively great dimensions and protective diodes having a relatively large crystal surface are necessary. This necessitates a large self-inductance of the resistances and a large self-capacitance of the diodes. However, components of this type influence the transmission properties of the fine protection against surge voltages for the digital signals in an unfavorable manner, in particular, on the transmitting side, since steep pulses with as great as possible an amplitude must be generated here, which presupposes low parasitic impedances of the components.

SUMMARY OF THE INVENTION

Accordingly, it is the object of the present invention to provide an intermediate repeater or regenerative repeater of the type generally set forth above in such a manner that the noise pulses, which the surge voltage arrester provides for coarse protection against surge voltages, brings about upon its response, are strongly reduced on their path to the input, or output, respectively, in particular, with respect to the edge steepness. This is connected with difficulties particularly when the path in which the noise pulse reaches the input, or output, respectively, relates to a very broadband transmission path.

According to the present invention, the above object is achieved in that the circuit arrangement is so designed that a series connection, containing the surge voltage arrester and an inductance, is connected by way of a low-pass filter located outside the remote feed current path between a connection, located between the inductor arrangements of the current supply separating filters, of the remote feed current path and the cable outer conductor connection.

What therefore results is that neither at the input nor the output of the intermediate repeater or regenerative repeater is a safe voltage arrester directly connected with the cable inner conductor. Through the structure of the present invention, the advantage results that, in spite of the steepness of the voltage jump generated with the response of the surge voltage arrester, neither in the input circuit nor in the output circuit of the intermediate repeater or regenerative repeater can disturbing voltages, whose frequencies fall in the broad useful signal transmission bands, reach the signal transmission path with an amplitude which could represent a load for the fine protection against surge voltages and/or for the active components of the repeater, the load having a disadvantageous effect on the reliability of the arrangement.

In accordance with a particular feature of the invention, the series connection contains an ohmic resistance.

Advantageously, the inductance and the ohmic resistance are formed by an inductor which has a winding of wire consisting of a material having great specific resistance, in particular, constantan. The value of the ohmic resistance preferably amounts to at least approximately 0.5 ohm.

In an advantageous embodiment of the invention, the low-pass filter is so arranged that it is simultaneously arranged in a feedback path present between the output and the input of the intermediate repeater or regenerative repeater.

In a further embodiment of the invention, the circuit arrangement is so designed that the low-pass filter is a constituent part of a frequency separating filter preconnected with the input of the intermediate repeater or regenerative repeater, respectively, or post-connected with the output, respectively.

For the above circuit structures, the advantage results that the low-pass filter is exploited in two ways and therefore does not signify any additional expense.

BRIEF DESCRIPTION OF THE DRAWINGS

Other objects, features and advantages of the invention, its organization, construction and operation will be best understood from the following description, taken in conjunction with the accompanying drawings, on which:

FIG. 1 shows a circuit arrangement for the coarse protection against surge voltages, comprising a low pass filter for the purpose of reducing arrester disturbing voltages;

FIG. 2 shows a circuit arrangement, comprising a coarse protection against surge voltages, and comprising a low pass filter arranged in such a fashion that both arrester disturbing voltages as well as a high frequency feedback from the output to the input are reduced; and FIG. 3 shows the construction of a regenerator or regenerative repeater with an internal chamber and a cable outer conductor connection guided via an outer chamber.

DESCRIPTION OF THE PREFERRED EMBODIMENTS

FIG. 1 illustrates a circuit arrangement for coarse protection against surge voltages for an intermediate repeater or a regenerative repeater, respectively. The input E and the output A are directly interconnected via remote feed separating filters. On the side of the input E, a gas-filled surge voltage arrester 1 is provided.

The intermediate repeater contains an active repeater portion 6, which is remotely fed via the two remote feed elements 2, 4 and 9, 11, via the inner conductor of the coaxial cable. From the input path E of the repeater, the useful signal passes by way of the capacitor 4, serving as a high-path filter of the input-side remote feed separating filter 2, 4 to the active repeater portion. The output of the active repeater portion 6 is fed, via the capacitor 9 serving as a high-pass filter of the output-side remote feed separating filter 9, 11, to the output A of the intermediate repeater. In the case of utilization of a current control in the active regenerative portion, the capacitor 9 can be omitted.

The intermediate repeater is equipped for d.c. current remote feeding. The inner conductor of the incoming coaxial cable is fed in via an inductor 2, the resistance 7, and the inductor 11 to the inner conductor of the outgoing coaxial cable. The resistance 7 represents the resistance which is effective at the feed input E of the active repeater portion 6. The voltage drop, brought about by the remote feed current at the resistance 7, and hence at the feed input E, is limited by the Zener diode 8 connected in parallel with the feed input E.

One connection of the feed input E is connected to the ground potential of the active repeater or regenerator portion 6, respectively, and, via the capacitor $3_1$, serving as a blocking capacitor, is connected to the outer conductor 13 of the cable which directly interconnects the outer conductors of the incoming and outgoing coaxial cable. The other connection of the feed input E is connected by way of a capacitor 12 to the outer conductor 13.

The remote current path extends from the input E via the inductor 2 to the housing, or screen, of the active repeater portion 6 and, from there, via the resistance 7, through the feed-through capacitor 10, and, by way of the inductor 11 to the output A. The feed-through capacitor 10 closes the high-frequency path of the output circuit.

If the arrester is connected parallel to the capacitor $3_1$, the arrester 1, for the surge voltage pulses having steep edges and appearing on the incoming cable, acts as if connected between the inner and outer conductors of the coaxial cable, since the inductor 2 has a low impedance for low frequencies. Given a corresponding dimensioning of the wire cross-section of the coil winding, the protective action of the arrester 1 is therefore guaranteed.

The arrangement of the arrester essentially has the advantage that the capacitor $3_1$ reduces the steepness of the voltage jump generated upon actuation of the arrester 1, and correspondingly reduces the amplitude of the noise voltage coupled into the input circuit or output circuit, respectively, of the regenerator 6, since the high-frequency components of the voltage jump are attenuated by the capacitor $3_1$. In practice, the attenuation effect of the capacitor $3_1$ is impaired fir high-frequency through unavoidable lead inductances as well as the self-inductance of the capacitor coatings, which, due to the necessary dielectric strength, in particular, approximately 2–3 kV, and the dimensions resulting therefrom, e.g. in the case of a wound capacitor, cannot be technically reduced below a certain degree.

Through the low pass filter $5_1$, $15_1$, which, in the illustrated example, is completed through the inductance 14 to form a T section, in a simple manner, through additional attenuation measures between the arrester 1 and the separating filter capacitor $3_1$, a slower discharge of the separating voltage capacitor $3_1$ with simultaneous attenuation of the noise voltage generated by the arrester 1 is achieved. Upon ignition of the arrester 1, the capacitor $3_1$ charged to the arrester minimum operating threshold voltage, is not discharged in a short circuit manner via the arrester. Since the current alterations in the case of discharge of the separating filter capacitor $3_1$ and the additional capacitor $5_1$ via the arrester 1 is considerably slow through the inductance of the coils 14 and $15_1$, and the steepness of the voltage alteration particularly on the separating filter capacitor $3_1$ is reduced, both the pulse load, in particular, of the separating filter capacitor $3_1$ and the noise amplitude, coupled into the repeater or regenerator, respectively, are reduced.

The conducting voltage of a gas-filled surge voltage arrester, as is known, decreases partially with an increasing current intensity. As investigations within the scope of the present invention have demonstrated, the partially dropping current-voltage characteristic curve of the arrester 1 resulting therefrom can lead, during the discharge of the separating filter capacitor $3_1$ via the low-pass filter 14, $5_1$, $15_1$ to high-frequency resonant vibrations with increasing amplitude, which reach the regenerator via the current supply separating filter $3_1$, 2, 4. Noise voltages of this type can be attenuated in a simple manner in that the coil 14 is designed with a corresponding equivalent series resistance through utilization of a winding having a high specific resistance, e.g. constantan.

The inductor 14 has, in particular, an inductance $L=300$ nH and a winding resistance $R_s=0.5$ ohm. The coil $15_1$ can be advantageously realized with the aid of one or more ferrite ring cores which are slipped over the connection line between the capacitors $5_1$ and $3_1$.

The intermediate repeater, or regenerative repeater, respectively, according to FIG. 2 largely agrees with that according to FIG. 1. In the case of the intermediate repeater illustrated in FIG. 2, differing therefrom, the capacitor $3_1$, which connects the inductor 2 with the outer conductor of the coaxial cable, is replaced by a capacitor $3_2$ which, together with the winding $15_2$ of an inductor 17, be connected in series therewith is disposed between the ground potential of the amplifier 6 and the outer conductor of the coaxial cable connection 13. The other winding of the inductor 17 is disposed in the input line i connected to the input terminal E. The connection of the winding $15_2$, facing the coaxial cable of the cable section, is fed via the capacitor $5_2$ of the low-pass filter to the ground potential of the amplifier 6.

In practice, the line inductor is preferably realized by a ferrite core placed on the coaxial line. The series connection consisting of the surge voltage arrester 1 and the inductor 11 lies directly between the ground potential of the amplifier 6 and the outer conductor 13 of the coaxial cable.

As is apparent from FIG. 2, a regenerator construction having a comparatively low circuit expense results by virtue of the fact that the low-pass filter 15, $5_1$, $5_2$, $15_1$ in the input circuit of the regenerator is so arranged that it reduces both noise voltages which are caused by the arrester 1 and high-frequency feedback from the output A to the input E of the regenerator.

An input circuit of this type leads, in particular, in the case or regenerators, to the transmission of high-frequency digital signals with a particularly low total expense since, in this case, high requirements exist of the backward attenuation from the output A to the input E of the regenerator, on the one hand, and since the lead inductance and self inductance set a technical limit to the separating filter capacitors $5_2$ and 12 regarding the attainable circulation attenuation, on the other hand. In this connection it is to be understood that the term circulation attenuation is the attenuation between the output A of the intermediate repeater or regenerative repeater, respectively, and the input E.

A regenerator or repeater, respectively, in which, proceeding from the circuit of FIG. 2, instead of the inductor 17 in the line, a piece of coaxial line is provided with a ferrite core thereupon in the circuit of FIG. 3.

The regenerator repeater according to FIG. 3 also differs from that accordance to FIG. 2 insofar as, on both sides of the active portion $6_3$, frequency separating filters having a low-pass filter are provided. Components corresponding to one another are provided with reference characters which differ only by a prime (').

In order to shield the useful signal against noise voltages, a coaxial line is provided between the input terminal E and the high-pass filter 4, the outer conductors $a_3$ of the coaxial line being connected, on the cable side, with the outer conductor 13 of the intermediate coaxial line, and being connected on the regenerator side with the capacitors $5_3$ and $3_3$.

The coil $15_2$ is inserted in the connection of the capacitors $3_2$ and $5_2$, connected to the outer conductor 13 of the cable instead of, as according to FIG. 1, in the connection to the regenerator potential, and is realized through ferrite ring cores which are slipped over the input-size coaxial line 17. The coil $15_2$ forms a line inductor, with the coaxial line 17 as a winding, which line inductor, as is known, does not influence the useful signal arriving between the inner conductor $i_3$ and the outer conductor $a_3$, since the magnetic field of the signal current flowing in opposite directions in the inner and outer conductors is canceled. During the ignition operation of the arrester 1, by contrast, a noise current flows only by way of the outer conductors $a_3$, so that the inductance of the line inductor $15_2$ becomes effective and attenuates the noise current through the capacitor $3_2$. The low-pass filter 14, $5_2$, $15_2$, therefore has the effect of the low-pass filter 14, $5_1$, $15_1$ according to FIG. 1.

The useful signal current flowing to the regenerator output A brings about a voltage drop on the output-side shunt capacitor 12 according to FIG. 2, which voltage drop via the outer conductor 13 and the outer conductor $a_3$ of the input-side coaxial line, drives a noise current into the input-side selection capacitor $3_3$. Since this noise current flows only by way of the outer conductor $a_3$ of the coaxial line $a_3$, $i_3$, the inductance of the line inductor 20 is effective and attenuates the noise current.

The arrangement of the coil $15_2$ according to FIG. 2 with the capacitor $5_3$ and the capacitor $3_3$ forms a so-called potential separating filter. The latter attenuates, in the indicated manner, both the noise current, dependent upon the regenerator output signal, and, together with the coil 14, the noise current generated by the arrester 1 in the input circuit of the regenerator.

In the case of high requirements of the magnitude of the attenuations, the potential separating filter according to FIG. 3 can be provided with a shield 18 connected to the regenerator reference potential. The shield is advantageously connected to the potential of the active regenerator portion $6_3$. The output-side potential separating filter can possibly be replaced by a shunt capacitor.

The arrangements according to FIG. 2 and FIG. 3, with discrete components, in particular, discrete capacitors 3 and 5, can be constructed with respect to an upper frequency limit of approximately 100 MHz. For an upper limit frequency of approximately 1 GHz, an arrangement is particularly suitable as is apparent from the German published application No. 31 22 084, fully incorporated herein by this reference. In this case, the circuit arrangement is, in particular, so designed that the outer conductor of a homogeneous line is connected at least capacitively with the inner conductor of a non-homogeneous line, and the connection, adjacent a connection cable, of the outer conductor of the non-homogeneous line is connected with a shield, and the other connection of the outer conductor is connected with the reference potential of the active repeater or regenerative portion, respectively, and that the series connection consisting of the surge voltage arrester and the inductance is arranged between the shield and the outer conductor of the cable.

In the circuit arrangements illustrated on the drawing, the active repeater portion of regenerative portion 6, respectively, is provided with a separate device for fine protection against surge voltage on the sides of the input E at the output A. This fine protection against surge voltage can be realized in a known manner, e.g. with the aid of Zener diodes and is therefore not illustrated in detail on the drawing.

For the purpose of protection of the Zener diode 8 against overloading, it is possible to expediently preconnect a resistance with the Zener diode, and to place, over the series connection of the Zener diode and resistance, a surge voltage arrester having low minimum operating threshold voltage, e.g. 90 V. The resistance is disclosed between the feed input E and one of the two remote separating filters, as in the German allowed application No. 14 62 247, fully incorporated herein by this reference.

The circuit arrangement for surge voltage protection is particularly suited for regenerative repeaters which transmit digital signals with a comparatively high bit rate, in particular, several hundred Mbit/s via a coaxial cable.

A likewise suitable connection point for a current branch with a surge voltage arrester, which can be provided, instead of or in addition to the arrester 1 is, for example, in FIG. 3 the connection point of the inductor $11_3$ with the Zener diode $8_3$. The feed-through capacitor $10_3$ therefore also to be dimensioned with respect to the noise pulse.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement which protects against coarse surge voltages at a repeater between incoming and outgoing coaxial cables each including an inner conductor and an outer conductor, said arrangement comprising: an intermediate coaxial cable means including an inner
   conductor and an outer conductor means, an input terminal connecting said inner conductor of said intermediate cable means to said inner conductor of said incoming coaxial cable and first and secind output terminals respectively connecting said inner conductor of said intermediate cable means to said inner conductor of said outgoing coaxial cable and said outer conductor means of said intermediate cable means to said outer conductor of said outgoing coaxial cable;
   a pair of current supply separating filters respectively connected between said input and output terminals and said outer conductor means of said intermediate coaxial cable means;
   a surge voltage arrester which protects against coarse surge voltages;
   a remote current feed path including said inner conductor of said intermediate coaxial cable means including said current supply separating filters;
   each of said current supply separating filters comprising an inductor connected to said input and first output terminals, respectively;
   a connection between said inductors; and
   a series circuit including said surge voltage arrester, an inductor, a low-pass filter connecting said series circuit to said connection between the outer conductors of said incoming and outgoing cables.

2. The circuit arrangement of claim 1, wherein: said series circuit comprises an ohmic resistance.

3. The circuit arrangement of claim 2, wherein: said series circuit comprises an inductor coil constituting an inductance and said resistance.

4. The circuit arrangement of claim 2, wherein: said resistance comprises a value of 0.5 ohm.

5. The circuit arrangement of claim 1, wherein: said low-pass filter is connected in a feedback path between said first output terminal and said input terminal.

6. The circuit arrangements of claim 1, wherein: said low-pass filter comprises a further inductor having one end connected to said outer conductor means of said intermediate coaxial cable means, a capacitor connecting said one end to said input terminal via said inductor of one of said separating filter; and
   said surge-voltage arrester is connected to said respective conductor.

7. The circuit arrangement of claim 1, wherein: said low-pass filter of said frequency separating filter comprises a coaxial line connected to said input terminal and at least one magnetic core carried on said coaxial line;
   an internal housing and an external housing;
   a capacitor connecting the outer conductor of said coaxial line to said internal housing;
   said internal housing connected to the outer conductor of said incoming and outgoing cables and
   said voltage arrester mounted between said internal and external housings.

8. The circuit arrangement of claim 7, and further comprising:
   a further magnetic core supported on said coaxial line between said innenr and outer housings.

9. The circuit arrangement of claim 1, wherein:
   the outer conductor of a homogeneous line is at least capacitively coupled to the inner conductor of a non-homogeneous line whose outer conductor is connected to a shield and to a reference potential for said repeater; and
   the series connection of said surge arrester and said inductor is connected between said shield and the outer conductor of said cable.

* * * * *